United States Patent [19]

Fox et al.

[11] Patent Number: 4,561,087
[45] Date of Patent: Dec. 24, 1985

[54] CONDUCTIVE VIDEO DISC

[75] Inventors: Leonard P. Fox, Cherry Hill; Pabitra Datta, Cranbury; Dennis L. Matthies; Hirohisa Kawamoto, both of Princeton, all of N.J.

[73] Assignee: RCA Corporation, Princeton, N.J.

[21] Appl. No.: 105,550

[22] Filed: Dec. 20, 1979

Related U.S. Application Data

[63] Continuation of Ser. No. 818,279, Jul. 25, 1977, abandoned.

[30] Foreign Application Priority Data

Mar. 15, 1977 [GB] United Kingdom ............... 10824/77

[51] Int. Cl.$^4$ .............................................. G11B 11/08
[52] U.S. Cl. ...................... 369/276; 369/126; 358/342; 358/344; 252/511
[58] Field of Search ............. 365/102; 358/128.5, 358/127, 129, 297, 344, 335, 342; 179/100.1 B, 100.1 G, 100.4 R; 346/151, 77 E, 76 L; 274/41 A; 252/510, 511; 260/998.16, 23, 23 EP, 23 H; 369/276, 126, 288

[56] References Cited

U.S. PATENT DOCUMENTS

| | | | |
|---|---|---|---|
| 2,698,928 | 1/1955 | Pulvari | 365/117 |
| 2,997,451 | 8/1961 | Miller | 274/41 A |
| 3,072,543 | 1/1963 | Lubow | 179/100.1 B |
| 3,111,495 | 11/1963 | Murphy | 252/511 |
| 3,171,106 | 2/1965 | Lemmond | 346/151 |
| 3,314,073 | 4/1967 | Becker | 346/108 |
| 3,474,457 | 10/1969 | Becker | 346/76 L |
| 3,770,667 | 11/1973 | Tucker | 274/41 A |
| 3,787,873 | 1/1974 | Sato | 346/76 L |
| 3,798,388 | 3/1974 | Dickopp | 179/100.4 C |
| 3,833,408 | 9/1974 | Matthies | 252/27 |
| 3,842,194 | 10/1974 | Clemens | 179/100.1 B |
| 3,842,217 | 10/1974 | Clemens | 179/100.4 L |
| 3,855,426 | 12/1974 | Bouwhuis | 179/100.3 V |
| 3,909,517 | 9/1975 | Clemens | 179/100.1 B |

FOREIGN PATENT DOCUMENTS

| | | | |
|---|---|---|---|
| 137631 | 3/1947 | Australia | 179/100.4 R |
| 1181275 | 11/1964 | Fed. Rep. of Germany | 179/100.1 B |
| 114412 | 10/1974 | Japan | 369/276 |
| 634810 | 3/1950 | United Kingdom | 274/41 A |

Primary Examiner—Alan Faber
Attorney, Agent, or Firm—H. Christoffersen; B. E. Morris; R. H. Swope

[57] ABSTRACT

A video disc comprises a grooved disc having video information in the form of a surface relief pattern within the groove, the disc made from a plastic material containing finely divided conductive particles such that the bulk resistivity at 900 MHz is less than 500 ohm-centimeters.

28 Claims, 1 Drawing Figure

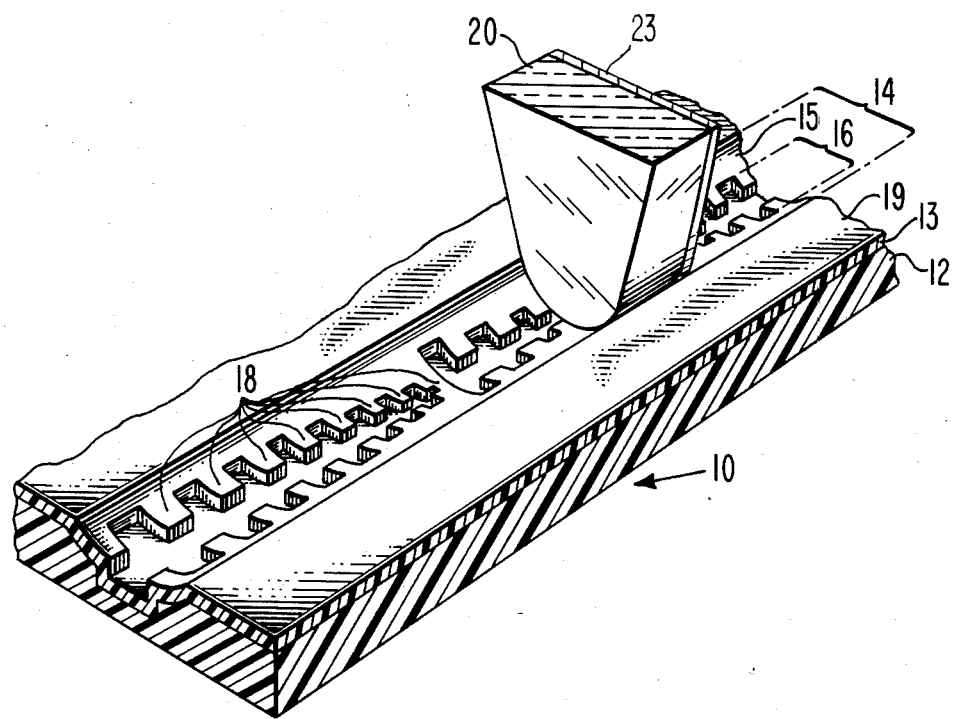

CONDUCTIVE VIDEO DISC

This is a continuation of application Ser. No. 818,279, filed 7-25-77, now abandoned.

This invention relates to a disc containing both audio and video information in the form of a surface relief pattern. More particularly, this invention relates to conductive video disc which can be played by a metal stylus as part of a capacitance playback system.

BACKGROUND OF THE INVENTION

A capacitance video recording and playback system has been disclosed in U.S. Pat. Nos. 3,842,194, 3,842,217 and 3,909,517 to Clemens, incorporated herein by reference. According to this system, disc replicas can be prepared having geometric variations in a spiral groove in the disc surface which correspond to capacitance variations representative of video signals. The discs are coated first with a thin conductive metal layer and then with a dielectric layer. A metal stylus completes the capacitor and, during playback, rides upon the dielectric coating and detects dimensional variations in the groove. These variations are reconstituted in electrical signal form and converted back to video information suitable for display by a television receiver. A suitable system for converting the information representing capacitance variations to electrical signals is described in copending application of Kawamoto et al, "Pickup Circuitry for a Video Disc Player", Ser. No. 743,144 filed Nov. 18, 1976 now U.S. Pat. No. 4,080,625.

Since the relief pattern and the groove are of very small dimensions, e.g., there are 5,000–10,000 grooves per inch (1968–3937 grooves per centimeter), much research and expense have been required to learn how to put down metal and dielectric layers which conform to the relief pattern, are thin enough so they do not fill the grooves and yet are thick enough so as to form a coherent, abrasion resistant and pinhole free layer.

It will be apparent that if the metal and dielectric layers could be eliminated, with no substantial loss of signal or increase in noise level on playback of the disc, it would be a great advance as far as cost savings in manufacturing are concerned.

SUMMARY OF THE INVENTION

We have found that non-coated conductive video discs adapted for use with a playback stylus and having a spiral groove containing an information track of a surface relief pattern can be made by molding a plastic material containing sufficient finely divided conductive particles. The video disc material must have a resistivity below about 500 ohm-centimeter at 900 megahertz (MHz) in order for the video signals to be reconstituted on playback by a metal stylus.

BRIEF DESCRIPTION OF THE DRAWING

The FIGURE illustrates a portion of a video disc of the invention.

DETAILED DESCRIPTION OF THE INVENTION

Conductive plastic materials suitable for use herein must contain sufficient finely divided conductive particles so that the filled plastic has a bulk resistivity at 900 MHz of less than 500, and preferably less than 100 ohm-centimeters. The conductive particles can be metals, such as nickel, copper, gold and the like, or conductive carbon particles.

Conductive particles suitable for use in the invention include highly electrically conductive, finely divided carbon blacks, preferably which have a low bulk density to reduce loading requirements. Presently preferred is a product of the Armak Co., Ketjenblack EC, which has an apparent bulk density of 150 grams per liter and an average particle size of about 300 angstroms. These carbon black particles have a high surface area and a high proportion of voids within the particles, as measured by dibutyl phthalate absorption, which enables current to flow between the conductive particles in a non-conductive polymer matrix in a highly efficient manner. Other carbon blacks can also be employed, in whole or in part, provided they meet the electrical requirements. Denser particles of carbon will usually require higher loading for an equivalent electrical conductivity. Finely divided conductive metal particles can also be employed.

The particle size of the conductive particles useful herein is not critical and various particle sizes or mixtures of particle sizes can be employed, provided the conductive particles are not so large that they would form a grainy surface in the plastic matrix which would interfere with the signal patterns in the grooved discs. In general, the particle size should be less than about 500 angstroms.

The amount of conductive particles added depends on the electrical properties required. The more conductive particles are added, the more conductive the composition will become, but large quantities of fillers such as carbon black decrease the processability of the molding composition and increase the brittleness of the product. That amount of conductive particles must be added for the present application to reduce the resistivity to below 500 ohm-centimeters at 900 MHz, preferably to below 100 ohm-centimeters and, most preferably, to below about 60 ohm-centimeters. Ketjenblack EC can be added in amounts of from about 10 to about 20 parts by weight, preferably about 15 parts by weight, for 100 parts by weight of the molding composition and achieve the desired conductivity. Other carbon blacks, which are denser materials, must be employed at higher loadings to achieve comparable resistivities, e.g., about 25–35 percent by weight of the molding composition. Improved results, insofar as electrical properties are concerned, are sometimes obtained by mixing Ketjenblack EC with minor amounts of another carbon black. Thus optimum compositions will contain the least amount of conductive particles that will give acceptable resistivity.

The conductive particles must be thoroughly mixed with the plastic matrix in order to prevent agglomeration of the particles which would reduce conductivity and also have an adverse effect on the physical properties of the filled plastic, e.g., increased brittleness and reduced processability.

The conductive particles are mixed with any suitable moldable plastic material. The criteria for choice depends on the physical properties of the material, e.g., moldability, brittleness, heat distortion temperature, melt temperature, melt viscosity, hardness, ageing characteristics and the like, rather than on any particular composition. Many suitable plastic molding compositions are commonly available, including polyvinyl chloride, polyvinyl chloride copolymers and terpolymers with polyvinyl acetate, propylene and the like, polyethylene-propylene copolymers, acrylic polymers and the like.

The chosen plastic can be mixed with various additional ingredients, such as stabilizers, lubricants, processing aids and the like, as is well known.

Suitable antioxidant stabilizers include organometallic compounds derived from metals such as tin, lead, zinc, barium and cadmium, such as dibutyl tin-$\beta$-mercaptopropionate, dibutyl tin maleate and the like. Epoxides, phosphites and alkylated phenols such as t-butyl catechol can also be employed.

Suitable lubricants are also well known and include fatty acids and esters such as stearic acid or hydroxystearic acid and the like; fatty acid esters of alcohols and fatty acids; polyfunctional acid and alcohol esters; soaps such as zinc, lead or calcium stearate and the like; fatty acid amides such as stearic acid amide, oleamide, ethylene bis stearamide and the like; and silanes such as dimethyl siloxane and the like. Sufficient lubricants must be added to prevent high shear heating during processing and to prevent sticking of the composition to the mold.

Various processing aids can also be added in minor amounts, such as polyvinyl chloride terpolymers, polymethylmethacrylate polymers and the like.

The amounts of additives employed will vary depending on the base polymer employed and the amount of conductive particles added, as well as the molding procedure to be followed, as is known. In general, amounts of from about 0.1 to about 5 percent by weight of the total weight of the molding composition are suitable.

For the present application, a thin dielectric layer must be present at the surface of the disc. This dielectric layer is provided by the presence of a thin film of molding composition around each conductive particle, or by adding sufficient lubricant to the molding composition so that a small amount bleeds to the surface forming a thin film. Alternatively, a thin lubricant film can be applied as a separate layer on the disc. This film serves as an added dielectric layer and also serves to reduce stylus wear. The lubricant film must be thin enough so that it does not fill the groove, but thick enough so as to form a pinhole-free layer. One lubricant type that has been employed successfully is a methyl alkyl siloxane of the formula

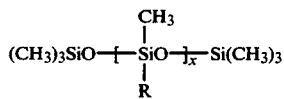

wherein R is an alkyl group of 4–20 carbon atoms and x is an integer. These films can be applied by spinning from solution, as is disclosed in U.S. Pat. No. 3,833,408, or they can be evaporated as disclosed in the copending application of Grubb and Nichols, Ser. No. 793,643, filed May 4, 1977 now abandoned.

The conductive particles can be added to the molding composition ingredients either prior to mixing or can be added to the molten molding composition. For example, a Banbury mixer and a Brabender apparatus or a twin screw extruder can be employed to mix the plastic and the conductive particles. The filled molding composition can be sheeted on a two roll mill, pelletized and stored for molding.

The bulk resistivity at 900 MHz of the above-described conductive composition was measured using a radio frequency network analyzer to measure the impedance. Hewlett Packard's Model HP8505A was employed, using as a sample holder fixture one suggested by the manufacturer. Discs about 5 mm in diameter were cut from molded samples, and the flat surfaces painted with silver conductive paint into which leads were pressed (see ASTM Test D257-66). The input reflection parameter was then measured at 900 MHz from which the conductance and in turn the resistivity can be calculated in known manner.

For the present application, suitability of the conductive plastic material for video discs is also determined by measuring certain electrical properties during playback of the molded disc according to the playback system described in Kawamoto et al, referred to hereinabove. A test signal is recorded at a carrier frequency of 5 MHz. Carrier level at 5 MHz (C), measured at millivolts peak to peak, is a function of the conductivity of the filled molding composition and generally increases at lower resistivities. To illustrate, playback of a prior art metal coated disc having a signal track modulation of about 600 angstroms representing a 5 MHz carrier, can provide a recovered carrier level of about 7.4 millivolts peak to peak. A similar carrier level is desirable for the present, disc having a similar signal track modulation, although good pictures can be viewed at lower levels of about 1 millivolt peak to peak.

Another property which measures the quality of the picture obtained is the carrier to noise (C/N) level ratio obtained during playback of a signal recorded at 5 MHz, which ratio should be as high as possible and at least about 40 decibels (dB) for commercially acceptable video. The prior art metal coated disc has a C/N ratio of about 54 dB. This ratio generally increases as resistivity decreases.

To determine low frequency noise performance, the ratio of the noise level at 0.5 MHz as related to the noise level at 5 MHz, obtained during playback of a signal recorded at 5 MHz is measured to indicate the slope of the noise floor. As the resistivity decreases, the slope of the noise floor decreases, i.e., the low frequency noise/high frequency noise level is smaller in low resistivity discs. Optimally, the slope of the noise floor (0.5/5 MHz) value should approach 3 dB.

The relative dielectric constant increases as resistivity decreases also. This constant at 900 MHz should have a value of 15 or higher for good quality video discs.

The invention will be further illustrated by the following Examples but it is to be understood that the invention is not meant to be limited to the details disclosed therein. In the Examples parts and percentages are by weight.

EXAMPLE 1

Eighty-one parts of a copolymer of polyvinylchloride and 15 percent of vinylacetate copolymer VYHH from Union Carbide Corporation, 2.5 parts of dibutyltin maleate stabilizer available as MK-275 from Argus Chemical Company, 1.2 parts of a fatty acid ester lubricant commercially available as Wax E from Hoechst Chemical Company and 16.2 parts of Ketjenblack EC of the Armak Company were mixed in a Banbury mixer under 20 pounds of steam for 1.5 minutes.

Good quality video discs were compression molded from a metal video disc master as described by Clemens in U.S. Pat. No. 3,842,194, at 330° F. (165° C.) using a 60 second cycle.

A thin layer of a methyl alkyl siloxane having a viscosity of 50 centistrokes and the formula

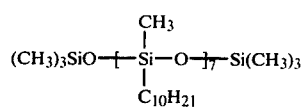

commercially available as SF-1147 of General Electric Company was applied by spinning.

The disc had a bulk resistivity of 10 ohm-centimeters at 900 MHz and a 5 MHz C/N level ratio on playback of 42 dB. The carrier level was 7.4 millivolts peak to peak (mVpp). The slope of the noise floor was 5 dB.

EXAMPLES 2-7

Good video discs were fabricated utilizing other carbon blacks or mixtures with the carbon black of Example 1, following the general fabrication procedure of Example 1. The data are summarized below in Table 1.

EXAMPLE 12

Part A

A molding composition was prepared by mixing the following ingredients in a Henschel mixer: 44 parts of a vinyl chloride - 8 percent propylene copolymer, AP-480 from Air Products and Chemical, Inc.; 10 parts of a vinyl chloride copolymer containing 15 percent of vinyl acetate, copolymer VYHH from Union Carbide Corporation; 10 parts of a vinyl chloride - 25 percent maleate ester, FPC-471 from the Firestone Company; 4 parts of 70 percent chlorinated paraffin wax, Unichlor 70 AX from Neville Chemical Co.; 3 parts of glyceryl tribenzoate available as Benzoflex S-404 from Velsicol Chemical Corporation; 2 parts of epoxidized soybean oil, having a molecular weight of about 1000 available from Rohm & Haas Co. as Paraplex G-62; 1.0 part of dibutyl tin-$\beta$-mercaptopropionate stabilizer, T-35 from M&T Chemical Company, Inc.; 1.0 part dibutyl tin maleate, Mark 275 from Argus Chemical Company; 1.5 part of barium-cadmium-lead stearate, Mark Q232B from Argus

TABLE 1

| Example | VYHH Resin, % | Wax E % | MK-275, % | Carbon Black | % | Resistivity at 900 MHz, ohm-cm. | Dielectric Constant, 900 MHz | C/N, dB | $\left(\dfrac{N_5}{N_{0.5}}\right)^{-1}$ | C, mVpp |
|---|---|---|---|---|---|---|---|---|---|---|
| 2 | 72.23 | 0.5 | 2.25 | C-960 (a) | 25 | 120 | 26 | 42 | 9 | 2.3 |
| 3 | 72.23 | 0.5 | 2.25 | Raven 1500 (b) | 25 | 440 | 13 | 38 | 11 | 0.37 |
| 4 | 72.23 | 0.5 | 2.25 | Raven 3500 (c) | 25 | 120 | 24 | 47 | 15 | 1.0 |
| 5 | 72.23 | 1.0 | 2.2 | Vulcan XC-72 (d) | 25.3 | 69 | 33 | 37 | 12 | 0.47 |
| 6 | 80.6 | 0.8 | 2.5 | Ketjenblack EC | 8 | 80 | 29 | 42 | 15 | 0.93 |
|   |       |     |     | Raven 3500 (c) | 8 |    |    |    |    |      |
| 7 | 80.6 | 0.8 | 2.5 | Ketjenblack EC | 12 | 46 | 45 | 42 | 8 | 4.2 |
|   |       |     |     | Raven 3500 (c) | 4 |    |    |    |    |      |

(a) Conductex-960 of Columbia Carbon Corp. having a particle size of 210 angstroms
(b) Raven 1500 of Columbia Carbon Corp. having a particle size of 180 angstroms
(c) Raven 3500 of Columbia Carbon Corp. having a particle size of 160 angstroms
(d) Vulcan XC-72 of Cabot Corp.

EXAMPLES 8-11

Good video discs were fabricated utilizing the carbon black of Example 1 and other molding compositions. The components were mixed and compression molded following the general procedure of Example 1. The data are summarized below in Table 2.

Chemical Company; 2.0 parts of a polymethylmethacrylate processing aid K-147 from Rohm & Haas Co.; 0.5 part of calcium stearate; 0.4 part of Wax E, an esterified montan wax from Hoechst Chemical Company; 0.3 part of Loxiol G-30 from Henkel International GmbH, a monofatty acid ester of varying molecular weight alcohols and acids; and 15.0 parts of Ketjenblack EC carbon black.

TABLE 2

| Ex. | Resin | % | Lubricant, | % | Stabilizer, | % | Carbon Black, % | Resistivity at 900 MHz, ohm-cm. | Dielectric Constant, 900 MHz | C/N, dB | $\left(\dfrac{N_5}{N_{0.5}}\right)^{-1}$ | C, mVpp |
|---|---|---|---|---|---|---|---|---|---|---|---|---|
| 8 | AP-480 (a)* | 80.25 | Calcium Stearate | 0.75 | T-35 (b) | 2 | 15 | 9.6 | — | 43 | 7 | 5.5 |
| 9 | AP-480 | 83.5 | Wax E | 0.9 | MK-275 | 2.6 | 13 | 57 | 38 | 38 | 13 | 2.3 |
| 10 | FS 965 (c) | 83.5 | Wax E | 0.9 | MK-275 | 2.6 | 13 | 17 | — | *40 | 12 | 3.7 |
| 11 | AP-480* | 83.35 | G-30 (d) G-70 (e) | 0.43 0.21 | T-35 | 1.76 | 12.4 | 71 | 28 | 35 | 16 | 1.0 |

(a) a copolymer of vinyl chloride and 8% propylene of Air Products and Chemicals Inc.
(b) dibutyl tin-$\beta$-mercaptopropionate of M & T Chemical Company Inc.
(c) a vinyl chloride homopolymer of Firestone Co.
(d) Loxiol G-30 is a monofatty acid ester of various molecular weight alcohols and fatty acids available from Henkel International GmbH.
(e) Loxiol G-70 is a mixture of polyfunctional acids and alcohol esters of Henkel International GmbH.
*also contains 1.75% of K-175, an acrylic processing aid of Rohm & Haas.

After the temperature of the mixture reached about 130° F. (54° C.) 5.0 parts of diisooctylphthalate plasticizer and 0.3 part of a low molecular weight paraffin oil from Carlo ERBA, a division of Chemica Industrialle, Milan, Oil Vaselina, lubricant were added and mixing continued until the temperature reached about 180° F. (82° C.).

Twelve inch (30.5 cm) video discs were compression molded at 330° F. (165° C.) using a 60 second cycle with a metal stamper described by Clemens in U.S. Pat. No. 3,842,194, referred to hereinabove.

The molding composition had a bulk resistivity at 900 megahertz of 13 ohm-cms. On playback, the molded discs had a 5 MHz C/N level ratio of 44 dB; the carrier level was 7.4 millivolts peak to peak. The slope of the noise floor was 7 dB.

Part B

A thin layer of a methyl alkyl siloxane lubricant having a viscosity of 50 centistokes and the formula

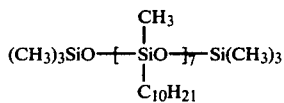

commercially available as SF-1147 of General Electric Co., was applied by spinning.

These discs had a 5 MHz C/N level ratio on playback of 46 dB; the carrier level was 6.6 millivolts peak to peak and the slope of the noise floor was 7 dB.

The FIGURE illustrates a portion of an information record 10 including a groove 14 in which a stylus 20 rides, enabling it to track the groove. The base material 12 of information record 10 is of a conductive thermoplastic material. A lubricant layer 13 overlays the base material 12. Modulation elements 18 in the groove appear as protrusions in a signal information track 16. The elements 18 provide capacitance variations between the playback stylus 20 having a conductive layer 23 on the rear face thereof and the conductive material 12.

As stylus 20 scans over the modulation elements 18, the area of the conductive base material 12 adjacent to the stylus 20 varies in accordance with recorded signal track information. The signal information track 16 covers a substantial amount of the groove area to maximize the difference between maximum and minimum detected capacitance. The remaining area in the groove comprises the groove walls 15 which support the stylus 20. The area between successive grooves comprises the land areas 19.

COMPARATIVE EXAMPLE

This example shows a carbon-filled molding composition having a high resistivity.

To the polymer composition of Example 11 was added 8.6 percent of Ketjenblack EC in a Banbury mixer for 1.5 minutes. The molding composition was compression molded at 330° F. (165° C.).

The conductivity was 3600 ohm-centimeters at 900 MHz, and the dielectric constant at 900 MHz was 8.1. The carrier level was 0.06 mVpp. No picture could be seen on playback.

We claim:

1. A video information record, adapted for use with a playback stylus to effect recovery of signals occupying a bandwidth of at least several megaherz when relative motion at a desired rate is established between said record and said stylus, said record comprising a disc of a moldable plastic material containing a sufficient amount of finely divided conductive particles so that the material has a bulk resistivity below about 500 ohm-centimeters at 900 MHz and having a layer of dielectric material at the disc surface, said surface having a spiral groove therein, said groove dimensioned for reception therein of said playback stylus and containing an information track constituted by a surface relief pattern in said groove of such dimension to accommodate recovery of signals of said bandwidth upon establishment of said motion at said rate.

2. An information record according to claim 1 wherein said conductive particles are carbon black.

3. An information record according to claim 1 wherein the bulk resistivity is below about 100 ohm-centimeters.

4. An information record according to claim 2 wherein said carbon black has an apparent bulk density of about 150 grams per liter.

5. An information record according to claim 1 which has a spiral groove containing an information track on both major surfaces.

6. An information record according to claim 1 wherein said plastic is a polymer of vinyl chloride.

7. A video information record, adapted for use with a playback stylus to effect recovery of signals occupying a bandwidth of at least several megahertz when relative motion at a desired rate is established between said record and said stylus, said record comprising a disc of a moldable plastic material containing a sufficient amount of finely divided conductive particles so that the material has a bulk resistivity below about 500 ohm-centimeters at 900 MHz and having a layer of dielectric material at the disc surface and containing an information track constituted by a surface relief pattern of such dimension to accommodate recovery of signals of said bandwidth upon establishment of said motion at said rate.

8. An information record according to claim 7 wherein said conductive particles are carbon black.

9. An information record according to claim 8 wherein said carbon black has an apparent bulk density of about 150 grams per liter.

10. An information record according to claim 7 wherein the bulk resistivity is below about 100 ohm-centimeters.

11. An information record according to claim 10 wherein said conductive particles are carbon black having an apparent bulk density of about 150 grams per liter.

12. In a recording means comprising a conductive disc having a layer of dielectric material at the disc surface and an information track containing video information in the form of a surface relief pattern and a uniform conformal lubricant layer disposed on the surface of said disc, the improvement which comprises employing as the disc material a plastic molding composition containing from about 10 to about 20 parts by weight of finely divided conductive carbon particles having an apparent bulk density of about 150 grams per liter per 100 parts by weight of the molding composition.

13. A recording means according to claim 12 wherein about 15 parts by weight of carbon black per 100 parts by weight of the molding composition is present.

14. A recording means according to claim 12 wherein the plastic is a polymer of vinyl chloride.

15. A recording means according to claim 12 wherein said information track is in the form of a spiral groove adapted to receive a playback stylus.

16. A recording means according to claim 12 wherein said lubricant is a methyl alkyl siloxane of the formula

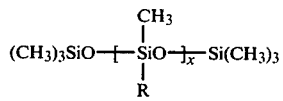

wherein R is an alkyl group of 4–20 carbon atoms and x is an integer.

17. In a capacitive recording means comprising a conductive disc of a moldable plastic having a layer of a dielectric material at the disc surface and containing an information track containing video information in the form of a surface relief pattern, the improvement which comprises employing as the moldable plastic a polymer of vinyl chloride containing from about 10 to about 20 parts by weight of conductive carbon particles having a particle size below about 500 angstroms and an apparent bulk density of about 150 grams per liter, per 100 parts by weight of the molding composition.

18. A recording means according to claim 17 wherein about 15 parts by weight of carbon black is present per 100 parts by weight of the molding composition.

19. A recording means according to claim 17 wherein said information track is in the form of a spiral groove adapted to receive a playback stylus.

20. A video information record, adapted for use with a playback stylus to effect recovery of signals occupying a bandwidth of at least several megahertz when relative motion at a desired rate is established between said record and said stylus, said record comprising a disc of a moldable plastic material containing a sufficient amount of finely divided conductive particles so that video signals can be reconstituted on playback with said stylus and having a layer of dielectric material at the disc surface, said surface containing an information track constituted by a surface relief pattern of such dimension to accommodate recovery of signals of said bandwidth upon establishment of said motion at said rate.

21. An information record according to claim 20 wherein said conductive particles are carbon black.

22. An information record according to claim 21 wherein the carbon black particles have a particle size of less than about 500 angstroms.

23. An information record according to claim 21 wherein said carbon black has an apparent bulk density of about 150 grams per liter.

24. An information record according to claim 23 wherein said moldable plastic material contains up to about 20 parts by weight of said carbon black for 100 parts of the moldable material.

25. An information record according to claim 21 containing up to 35 percent by weight of carbon black by weight of the molding composition.

26. An information record according to claim 20 which has a spiral groove containing an information track on both major surfaces.

27. An information record according to claim 20 wherein said plastic is a polymer of vinyl chloride.

28. In a recording medium of electrostatic capacitance type on which an information signal has been recorded as variation of geometrical shape of the recording surface part of the recording medium, and from which the signal is reproduced by the variation, in response to said variation of geometrical shape, of the electrostatic capacitance between an electrode of a reproducing stylus tracing relatively the recording surface of the medium and said recording surface part, the improvement comprising; that at least said surface part of the recording medium has the geometric shape variation molded from a thermoplastic synthetic resin into which an electroconductive material in powder or particle form has been admixed; and said synthetic resin forming an outer surface cover of said surface part of the medium, to thereby prevent exposure of said electroconductive material to the outside.

* * * * *